Oct. 27, 1931.  H. H. ELKINS  1,829,479
PLASTERING MACHINE
Filed June 14, 1926  2 Sheets-Sheet 1
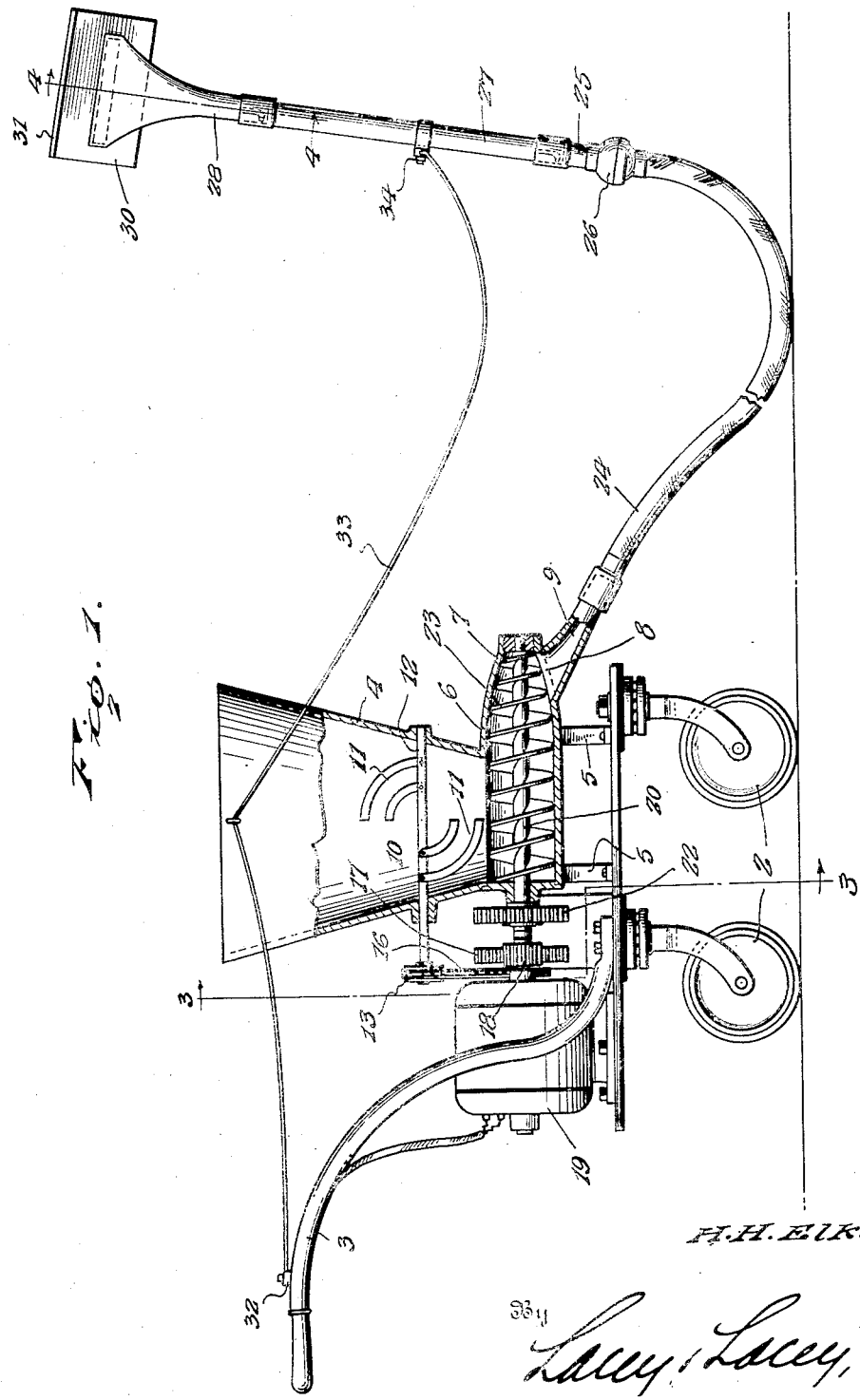
Inventor
H. H. Elkins.
By
Lacey & Lacey, Attorneys Oct. 27, 1931.   H. H. ELKINS   1,829,479
PLASTERING MACHINE
Filed June 14, 1929   2 Sheets-Sheet 2
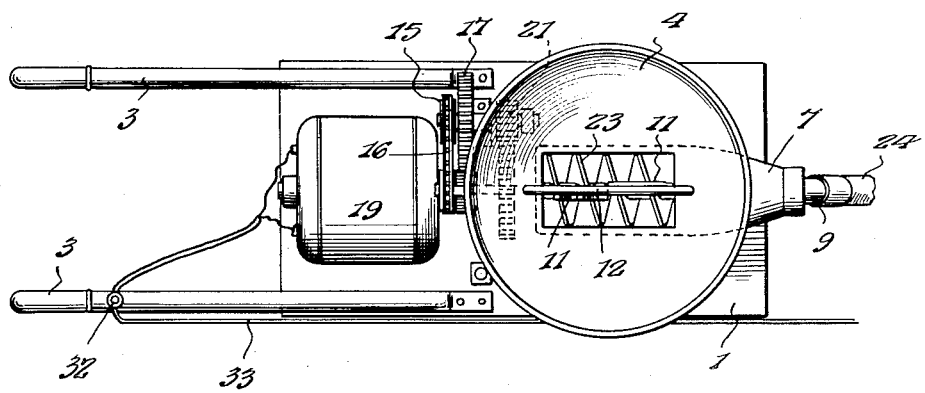
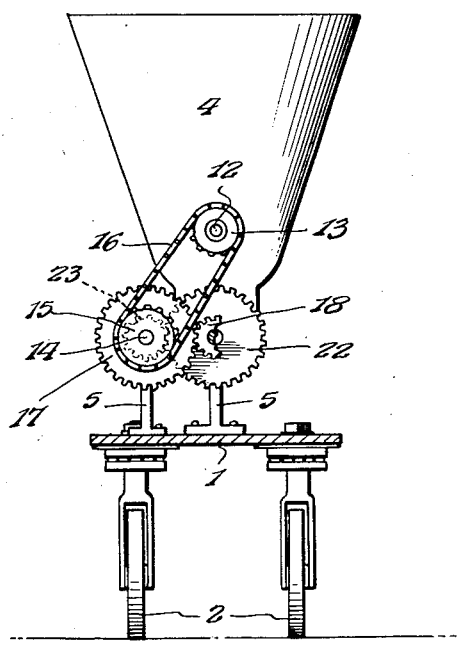
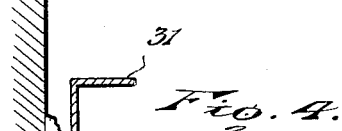
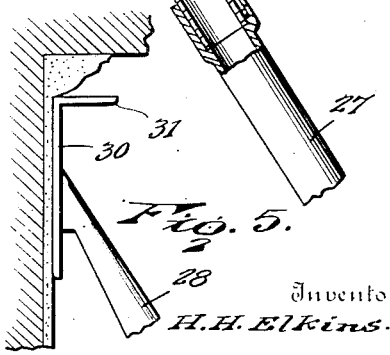
Inventor
H. H. Elkins.
By Lacey & Lacey,
Attorneys Patented Oct. 27, 1931

1,829,479

UNITED STATES PATENT OFFICE

HARRY H. ELKINS, OF PHILADELPHIA, PENNSYLVANIA

PLASTERING MACHINE

Application filed June 14, 1929. Serial No. 370,958.

This invention has for its object the provision of means whereby plaster may be applied to walls or ceilings expeditiously without waste and without scattering the plaster upon the floor of the room or the trimmings thereof or upon furniture which may be in the room. The invention is illustrated in the accompanying drawings and will be hereinafter fully set forth.

In the drawings:

Figure 1 is a sectional elevation of an apparatus embodying the invention,

Fig. 2 is a plan view of the truck with a hopper and motor thereon,

Fig. 3 is a sectional elevation on the line 3—3 of Fig. 1,

Fig. 4 is an enlarged section taken longitudinally through the trowel on the line 4—4 of Fig. 1, and Fig. 5 is an edge elevation of the trowel showing a manner of using the same different from that shown in Fig. 4.

In carrying out the invention, there is provided a truck consisting of a platform 1 mounted upon casters 2 whereby it may be easily moved from point to point, handles 3 being secured to and rising from the platform to facilitate the manipulation of the truck. Upon the truck adjacent the forward end thereof is mounted a hopper 4 upon feet or brackets 5 and of a downwardly tapered or conoidal form. The lower end of the hopper is formed into a longitudinally extending casing 6 having its front end tapered, as shown at 7, and having an outlet 8 in its lower side immediately adjacent its front end whereby the plaster may be discharged, the outlet 8 constituting the inner or upper end of a tapered nozzle 9. In the lower portion of the hopper is an agitator 10 consisting of arcuate arms 11 extending from a shaft 12 which is journaled in the front and rear walls of the hopper, as shown in Fig. 1, the rear end of the shaft being extended rearwardly of the hopper and equipped with a pinion 13. Mounted in suitable bearings upon the platform is a countershaft 14 and a pinion 15 is secured upon said shaft, a chain 16 being trained around said pinion and the pinion 13, as shown. The shaft 14 is also equipped with a spur gear 17 with which meshes a spur pinion 18 on the shaft of the motor 19. Alined with the motor shaft is a conveyer or feeder shaft 20 which extends axially through the casing 6, and upon the shaft 14 is secured a pinion 21 which meshes with a spur gear 22 on the conveyer or feeder shaft so that the train of gearing constitutes a speed reduction gear to transmit motion from the motor to the agitator and to the conveyer or feeder shaft respectively. Upon the shaft 20 is secured a worm 23 which works close to the inner wall of the casing and the turns or convolutions of which are reduced in diameter at the forward end so as to conform to the tapered formation of the case and thereby positively and cleanly feed the plaster into and through the nozzle 9.

Detachably fitted to the outlet end of the nozzle 9 is a hose or flexible pipe 24 which may be of any desired or convenient length and is provided at the end remote from the nozzle with an extension 25 connected to the hose through a universal coupling 26. The extension 25 is detachably coupled to a metal pipe 27 and to the far end of said pipe is detachably coupled a nozzle 28 which is tapered in one direction and is flared in a direction transverse thereto whereby it is caused to form a long narrow mouth 29. The hose and the extension 25 are connected with the nozzle 9 and the pipe 27, respectively, by bayonet slots so that they may be easily disconnected when desired to store the apparatus or to clean the parts, and the nozzle 28 is coupled to the pipe 27 in the same manner. Firmly secured to or formed integral with the mouth end of the nozzle 28 is a trowel 30 consisting of a flat plate having a slotted opening centrally therethrough coinciding with the mouth of the nozzle, and along the upper edge of the plate is a flange or rail 31 extending from side to side of the same and at a right angle thereto. If so desired, the angle formed by the plate 30 and the rail or flange 31 may be made convex and the lower edge of the plate may be likewise made convex so as to avoid digging into the fresh plaster.

The motor 19 is preferably an electric motor, as conventionally illustrated, and it may receive current through a power cable fitted into a lamp socket of the house wiring system. Mounted upon one of the handles 3 is a switch 32 of any convenient form, such as a push button, whereby the motor may be stopped or started at will and leading from the switch 32 is an extension cable 33 which passes to the pipe 27 and is there equipped with a switch 34 so that the workman operating the trowel may start or stop the motor at will without being required to stop his work and proceed to the truck.

It is thought the manner of using the machine will be readily understood. The fresh mixed mortar is placed in the hopper 4 to the capacity of the hopper and will be fed therefrom through the operation of the spiral conveyer 23, the agitator 10 preventing the plaster setting in the bottom of the hopper and choking the operation so that it will not enter the conveyer casing and be engaged by the conveyer. The plasterer, grasping the pipe 27 which serves as a handle for the trowel 30, places the trowel close to the wall, as shown in Fig. 4, and manipulates the trowel so that the plaster fed to and through the same will be caused to adhere to the wall and may be given the desired smooth finish just as is accomplished by the use of the ordinary hand trowel. The conveyer operates continuously, of course, until the current to the motor is cut off so that the plaster will be fed in a continuous steady stream through the hose 24 and the pipe 27 to and through the nozzle 28 and the central opening of the trowel and it will be applied directly to the wall in a strip or ribbon corresponding to the dimensions of the opening through the trowel while the thickness of the plaster deposited will be governed by the plasterer who will hold the trowel at the proper distance from the surface to which the plaster is being applied. It will be noted on reference to Figs. 4 and 5 that the rail or flange 31 is at the upper edge of the trowel and forms a right angle thereto so that the tool may be fitted into a corner formed by two walls or by a wall and the ceiling. When plaster is to be applied to the corner formed by a wall and a ceiling, the plaster is permitted to accumulate slightly between the trowel and the wall surface after which the trowel is jerked downwardly a short distance so that the rail or flange 31 will be brought below the upper edge of the accumulated plaster which thereupon will drop over onto the rail, as indicated in Fig. 5. The trowel may then be pushed sharply up into the corner and the plaster upon the rail will be thereby applied to the ceiling surface immediately at and adjacent the corner. It will be noted that the pipe 27 and the nozzle 28 form an obtuse angle with the trowel so that the pipe and nozzle constitute a handle whereby the trowel may be conveniently manipulated and held to the wall without requiring the operator to climb ladders or be otherwise inconvenienced. This arrangement of the handle elements also permits the trowel to be easily manipulated for applying the plaster to a ceiling surface.

The device is very simple and compact and may be easily shifted from place to place. The casters 2 are preferably equipped with rubber or cushion tires so that they will not mar a polished floor and are also preferably fitted with anti-friction bearings so that they will swivel easily. Inasmuch as the plaster is fed through the trowel, it is supplied to the surface to be finished in only such quantities as are necessary for immediate use and the handling of surplus plaster is avoided and the resultant dropping of plaster upon the floor or upon articles in a room is eliminated while at the same time the work is more speedily and efficiently accomplished than by the use of a hand trowel. By providing two switches, the workman is enabled to conveniently start the motor immediately after locating the truck at a convenient point in the room and during the interval needed for the plaster to reach the trowel the workman may lift the handle elements and the trowel so that when the plaster emerges through the trowel it will be applied at once to the wall. Should the supply of plaster be too rapid for proper working at any particular spot, the motor circuit may be broken at the switch 34 and the feeding of the plaster then stopped until the accumulation has been worked out, although some surplus may be carried upon the flange. The flange facilitates the application of plaster to surfaces in intersecting planes so that both sides of an angle may be covered without marring a finished side.

Having thus described the invention, I claim:

1. A plastering machine comprising a trowel having an opening therethrough between its edges and provided along its upper edge with a flange disposed at an angle to the plane of the trowel, and projecting away from the working face of the trowel, and means for feeding plaster to and through the opening in the trowel.

2. A plastering machine comprising a trowel provided with a plaster-supporting flange along its upper edge disposed at an angle to its face and projecting away from its face, and means for feeding plaster to the trowel.

3. A plastering machine comprising a portable hopper, a conveyor casing at the bottom of the hopper, a nozzle extending downwardly from said conveyer casing at the forward end of the same, a trowel, a tubular connection between said nozzle and the trowel, a worm conveyer within the casing, an agitator within the hopper above the conveyer, and means for rotating the agitator and the conveyer whereby to feed plaster from the hopper to the trowel.

In testimony whereof I affix my signature.

HARRY H. ELKINS. [L. S.]